July 25, 1933.  J. E. MARSDEN  1,919,341
STORAGE BATTERY
Filed March 10, 1931
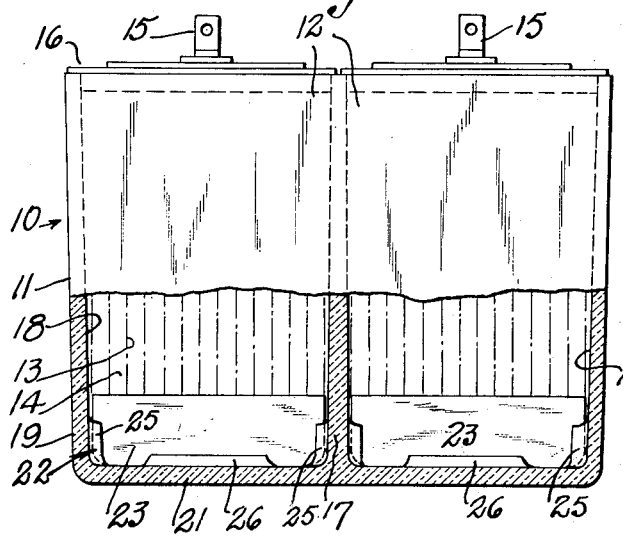
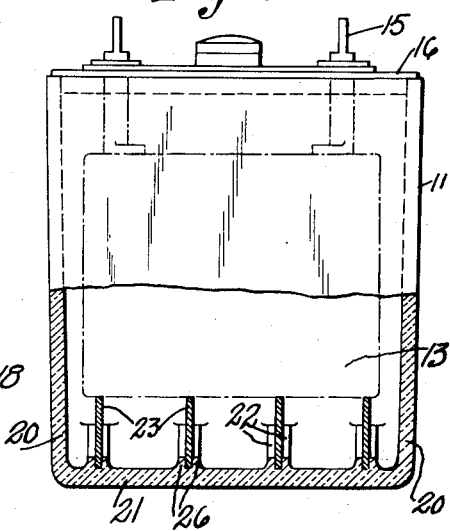
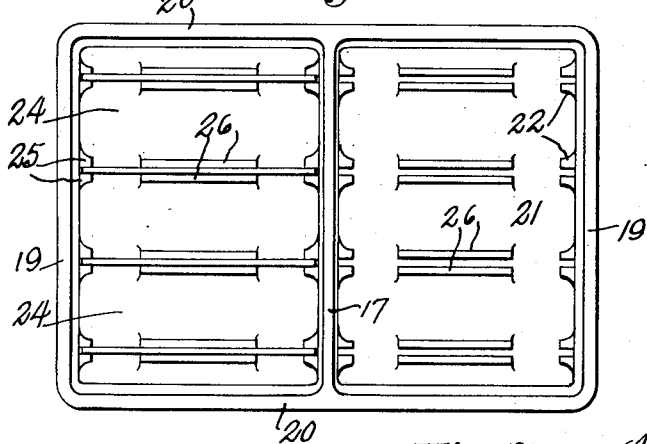
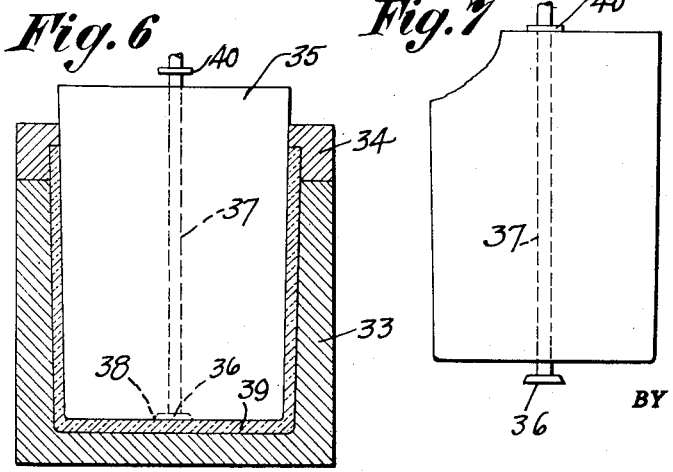
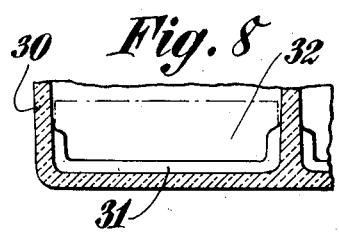
INVENTOR
John E. Marsden
BY
ATTORNEY Patented July 25, 1933

1,919,341

UNITED STATES PATENT OFFICE

JOHN E. MARSDEN, OF PHILADELPHIA, PENNSYLVANIA, ASSIGNOR TO GAYNER GLASS WORKS, OF SALEM, NEW JERSEY, A CORPORATION OF NEW JERSEY

STORAGE BATTERY

Application filed March 10, 1931. Serial No. 521,478.

This invention relates to storage batteries and has particular reference to battery cell jars, including the construction thereof as well as the method and apparatus for constructing the same.

One object of the invention is to provide a battery cell jar having improved bottom rests for the plates or associated parts, so arranged and constructed as to facilitate the manufacture of the jar, which, while adapted to be made of various materials, is preferably made of glass, in the casting of which peculiar problems arise due to the solidification, contraction of the glass and expansion of the mold; and it is also an object of this invention to provide a battery cell jar of this type which has an increased strength and uniformity in texture.

More specifically, battery cell jars have been constructed, for example, according to the practice of Patent No. 1,725,260, with continuous integral bottom ribs or rests, wherein it has been attempted by providing end re-enforcements, to prevent cracking or even separation of the rests from the side walls of the jar due to molding conditions. This problem has been caused by the fact that the plunger of the mold quickly cools and solidifies the rests while the remainder of the glass is still in a plastic state. In this regard, the problem is aggravated because, while the rests have already at least partially solidified owing to large surface contact with corresponding recesses in the end of the plunger, the glass is being forced upward by plunger displacement to form the side walls. Consequently, the junction between the side walls and the ends of the rests is accomplished by a relatively imperfect welding action, which frequently leaves a crack or sometimes results in a crack subsequently formed due to unequal expansion and contraction of the glass. This process of making the battery jar is, moreover, a delicate one since the plunger must remain in the mold for a sufficient length of time to assure a suitable degree of connection between the rests and the side walls of the jar, and, yet if the plunger remain in the mold more than a comparatively small fraction of a minute, it will have expanded sufficiently so as to bind against the contracting glass and render removal of the plunger exceedingly difficult.

It is therefore an object of the present invention to provide a battery jar structure and method of making the same which shall obviate these limitations and shortcomings.

Another object of the invention is the provision of an improved battery cell jar made of any suitable material and having removable rests, which are adjustable according to the size of the battery plates, and are reliably arranged and interconnected with the battery cell jar.

Another object of the invention is to provide an improved battery cell jar including simple means for rigidly effectively supporting the battery plates.

A further object of the invention is to provide an improved mold structure and method of making a battery cell jar facilitating removal of the plunger.

Other objects and advantages of the invention will be come apparent as the specification proceeds.

With the aforesaid objects in view, the invention consists in the novel combinations and arrangements of parts hereinafter described in their preferred embodiments, pointed out in the subjoined claims, and illustrated on the annexed drawing, wherein like parts are designated by the same reference characters throughout the several views.

In the drawing:

Figure 1 is a view in side elevation of a device embodying the invention, with parts removed to show the internal construction.

Fig. 2 is a similar view in end elevation thereof.

Fig. 3 is a top plan view thereof.

Fig. 4 is a side view of a removable rest element forming a feature of the invention.

Fig. 5 is a similar view of a modification thereof.

Fig. 6 is a view in vertical cross section of a mold embodying the invention.

Fig. 7 is a view in vertical elevation of the plunger.

Fig. 8 is a fragmentary sectional view of a modified battery jar construction.

The advantages of the invention as here outlined are best realized when all of its features and instrumentalities are combined in one and the same structure, but, useful devices may be produced embodying less than the whole.

It will be obvious to those skilled in the art to which this invention appertains, that the same may be incorporated in several different constructions. The accompanying drawing, therefore, is submitted merely as showing the preferred exemplification of the invention.

Generally described, this invention provides a storage battery including a jar having means therein for supporting the electrical generating member of the battery from underneath the same. In this manner the upper closure plate is relieved of the weight of said member, and preferably the member is pressed downward into snug contact with said means. The latter may include a plurality of spaced rests for affording a uniform support, and also for subdividing the bottom portion of the jar into a plurality of compartments for receiving the precipitates of the electrolyte in a distributed manner to prevent short circuiting of the plates by an accumulation of the precipitate at one point, due to possible jarring or tilting of the battery. Hence it will be evident that the rests must be rigid to uniformly and reliably support the battery member, and said plates must also be continuous in extent from wall to wall of the jar to support all of the closely spaced plates which practically entirely fill the jar. According to my invention, I provide a removable rest, which preferably consists of a plurality of separate elements which are easily rigidly engaged with the jar, which can hence be readily cast with the provision merely of suitable engagement lugs. The rest elements may also be interchangeable for adjustment according to the depth of the jar and the height of the battery element. In attempting to remove the plunger from a jar in casting, I provide an air valve to break the suction, and this facilitates the making of jars with plane bottoms, preventing upward bulging due to the suction mentioned, and therefore facilitating the proper seating of the rest elements.

Referring in detail to the drawing, 10 denotes a storage battery embodying the invention. The same includes a jar which may be made of any suitable material such as bakelite, glass or other composition material, in various well known ways. This battery jar may include one or more cells 12, each of which may comprise plates 13 of the electrical battery member, and insulator spacers 14, all arranged in the usual manner, and the positive and negative plates being respectively interconnected in units with the terminals 15 which project upward through the cover 16 at the top of the jar.

Where the battery comprises a plurality of cells, the jar is divided by a transverse wall 17 to form the compartments 18. Regarding each cell as a separate unit, the corresponding compartment thereof includes side walls such as 19 and 20, and a bottom wall 21.

Mounted in the lower portion of the jar are battery member supporting means 22, each of which may be constructed separate of the jar and removably engaged therewith. Specifically, the supporting means includes a plurality of rest elements such as 23 which may be interrelated or arranged in any suitable manner so as to afford a rigid continuous support, dividing the lower portion of the battery jar beneath the plates into sections such as 24. The rest elements may be disposed in upright planes by proper interconnection, which, however, is effected preferably with the side walls of the jar itself. For this purpose the jar may have irregular engagement portions, for example, the pairs of integral alined spaced lugs 25 at opposite walls of the jar. These lugs are of substantial height and of approximately equal height with the rest elements to adequately rigidly engage the rest elements 23, and they may extend to the bottom wall of the jar so as to re-enforce the jar at adjacent corners thereof. If desired, the said bottom wall may also have pairs of lugs or flanges 26 alined with the lugs 25 for additional engagement with the rest elements. By giving the flanges 26 a suitable length they are well adapted to re-enforce the bottom wall of the jar, but said flanges are preferably of limited extent so as to occupy as little volume as possible and afford a maximum space for the reception of the precipitate.

The rest elements 23 may be of narrow strip form, and may be made of glass, bakelite, or other composition material. The latter are used in preference to glass because they are less brittle and possess sufficient strength to be made quite thin and nevertheless amply carry the weight and pressure of the battery member which may be jammed thereon by properly tightening down on the cover 16. A hard but slightly yielding rubber may also be used, or the rest elements may be coated therewith so as to assure a yielding adjustment to the jar and battery member. These rest elements are inserted between corresponding lugs 25 and 26 so as to extend in uniformly spaced vertical planes and in parallel relation across the jar. The rest elements may be cemented in place, if desired, but the lugs are found in practice to be amply sufficient to hold them rigidly.

The rest elements are interchangeable with others of a different height to take care of varying sizes of the battery plates. Moreover, should the thickness of the bottom 21 be excessive resulting in a battery jar of less than the required depth, the rest element may be easily replaced or altered to be of less depth to afford the requisite space for the plates. Heretofore such excessive thickness of the bottom, caused by placing too large an amount of glass in the mold, has necessitated that the battery jar be discarded.

In practice, the plates of the battery member are guided into position by the downward convergence of the walls of the jar, which results from the provision of draft for casting. However, any other guides or spacing means may also be used, but in either case the end plates are slightly spaced from the adjacent walls of the jar for action by the electrolyte.

Another feature of the invention is that the bottom wall of the jar may be made perfectly plane for proper seating of the rest elements. Such construction may be effected by means of the molding apparatus hereinafter described.

In Fig. 5 is shown a modified form of rest element 27 having a lower central cut out 28 for increasing the space at the bottom of the jar. The upper edge of this element may be beveled as at 29 for yielding under the pressure of the battery plates to afford slightly recessed seats and assure an even seating of the plates.

In Fig. 8 is shown another modification of the jar 30 wherein the side and bottom lugs are constructed as continuous flanges 31 for strongly re-enforcing the bottom of the jar and continuously engaging the rest elements 32.

In Figs. 6 and 7 is shown the mold construction including a base member 33, a ring 34 and a plunger 35. The latter may be provided with an air valve 36 mounted on a stem 37 loosely extending centrally through the plunger. In practice a predetermined quantity of glass is placed in the mold, and when the plunger descends, the valve strikes the glass and is moved into closure position against the seat 38 in the plunger as shown in Fig. 6. When withdrawal of the plunger begins, the valve opens to break the suction and permit easy withdrawal of the plunger, eliminating the tendency of the bottom wall 39 of the plunger from bulging upward. In this way a perfectly plane bottom wall may be obtained and removal of the plunger effected without strain or other distortion of the jar. The opening movement of the valve may be limited by a stop 40 on the upper end of the stem above the plunger.

It will be appreciated that various changes and modifications may be made in the device as shown in the drawing, and that the same is submitted in an illustrative and not in a limiting sense, the scope of the invention being defined in the following claims.

I claim:

1. A device including a one piece glass storage battery jar, and a bottom rest for a battery member, said jar having a plurality of elongated parallel recess forming lugs secured to the bottom wall of said jar, said lugs terminating in spaced relation to adjacent side walls of the jar, said jar having a plurality of lugs secured to each of said side walls forming recesses terminating in the plane of the bottom of the jar in alinement with the recesses between the lugs secured to the bottom walls and in spaced relation to the latter, said bottom rest being removably positioned in said recesses and resting on the bottom of the jar, the lugs secured to the bottom wall being low so as to form a shallow recess, and the lugs secured to the side walls being narrow so as to form shallow recesses and having a greater elevation than the other lugs for affording lateral support to the bottom rest.

2. A device including a storage battery jar having relatively thin integral bottom and side walls of a molded composition material, and a bottom rest for a battery member, said jar having the plurality of lugs, at opposite corners of the jar, said lugs being reenforcingly integrally secured to the bottom and side walls of the jar and terminating at the bottom wall, said lugs affording corner recesses alined with each other across the jar, the bottom wall of the jar having a plurality of lugs intermediate of and spaced from the corner lugs, said intermediate lugs affording a recess alined with the corner recesses, said corner lugs being of substantially greater height than the end lugs, said recesses having their bottoms substantially in the plane of the surface of the said bottom wall, said bottom rest being reenforcingly removably positioned in the corner and intermediate recesses and resting on said bottom wall, and said lugs being of small transverse size so that said recesses are shallow.

3. A device including a storage battery jar having relatively thin integral bottom and side walls, and a bottom rest for a battery member, said jar having a series of spaced pairs of lugs at opposite corners of the same, said lugs being reenforcingly integrally secured to the bottom and side walls of the jar and a pair of lugs at one corner affording a recess alined with that at an opposite corner, the bottom wall having a series of spaced pairs of elongated lugs intermediate of and spaced from the corner lugs and affording corresponding recesses alined with those of the pairs of corner lugs, the corner lugs being vertically elongated and extending to a greater height than the intermediate lugs, the free upright edges of the corner lugs intersecting the bottom wall substantially at right angles, the recesses of the corner and end lugs being shallow and having their bottoms in the planes of the respective walls along which they extend, and said bottom rest being removably positioned in said recesses.

4. A device including a battery jar of one piece molded construction, and bottom rests for battery members, said jar being of substantially rectangular cross section and having a bottom side and end walls, an upright partition extending across the jar and integrally united with the bottom and side walls so as to divide the jar into a plurality of battery compartments, pairs of corner lugs integrally connected to the partition at opposite faces thereof, in spaced relation to the sides of the jar, other pairs of corner lugs integrally connected to the end walls of the jar, the different pairs of lugs affording recesses in alinement with each other in the individual jar compartments, and intermediate pairs of lugs integrally connected to the bottom in the different compartments in spaced relation to the other lugs and affording recesses in alinement with the other recesses in the individual compartments, the bottom rest being removably positioned in the different compartments within the alined recesses thereof.

5. A device including a battery jar of one piece molded construction, and bottom rests for battery members, said jar being of substantially rectangular cross section and having a bottom side and end walls, an upright partition extending across the jar and integrally united with the bottom and side walls so as to divide the jar into a plurality of battery compartments, pairs of corner lugs integrally connected to the partition at opposite faces thereof in spaced relation to the sides of the jar, other pairs of corner lugs integrally connected to the end walls of the jar, the different pairs of lugs affording recesses in alinement with each other in the individual jar compartments, and intermediate pairs of lugs integrally connected to the bottom in the different compartments in spaced relation to the other lugs and affording recesses in alinement with the other recesses in the individual compartments, the several corner lugs being also connected to and terminating at the bottom wall of the jar, and being vertically elongated, the intermediate lugs being horizontally elongated, and the recesses of the corner and intermediate lugs being shallow with their bottoms substantially in the planes of the walls along which they respectively extend, the bottom rests being removably positioned in the different compartments within the alined recesses thereof.

JOHN E. MARSDEN.